US011157780B2

(12) United States Patent
Turco et al.

(10) Patent No.: US 11,157,780 B2
(45) Date of Patent: Oct. 26, 2021

(54) MODEL-BASED ANALYSIS IN A RELATIONAL DATABASE

(71) Applicant: SAP SE, Walldorf (DE)

(72) Inventors: Vincenzo Turco, Rome (IT); Annika Berger, Karlsruhe (DE); Hans-Martin Ramsl, Mannheim (DE)

(73) Assignee: SAP SE, Walldorf (DE)

( * ) Notice: Subject to any disclaimer, the term of this patent is extended or adjusted under 35 U.S.C. 154(b) by 628 days.

(21) Appl. No.: 16/054,242

(22) Filed: Aug. 3, 2018

(65) Prior Publication Data

US 2019/0073570 A1 Mar. 7, 2019

(30) Foreign Application Priority Data

Sep. 4, 2017 (EP) ..................................... 17189250

(51) Int. Cl.
*G06F 11/07* (2006.01)
*G06F 9/50* (2006.01)
(Continued)

(52) U.S. Cl.
CPC .......... *G06K 9/6269* (2013.01); *G06F 9/4806* (2013.01); *G06F 16/2282* (2019.01);
(Continued)

(58) Field of Classification Search
CPC ... G06K 9/6269; G06F 16/284; G06F 16/288; G06F 16/2282; G06F 16/26;
(Continued)

(56) References Cited

U.S. PATENT DOCUMENTS

| 8,694,540 B1 * | 4/2014 | Lin ....................... G06F 16/211 707/777 |
| 2014/0067867 A1 * | 3/2014 | Pattabhi ............ G06F 16/24542 707/792 |

(Continued)

FOREIGN PATENT DOCUMENTS

| WO | 03/075176 A2 | 9/2003 |
| WO | 03/075176 A3 | 9/2003 |

OTHER PUBLICATIONS

Xing Chen et al., Drug-Target Interaction Prediction: Databases, Web servers and Computational models, Aug. 17, 2015, [Retrieved on Jun. 2, 2021], Retrieved from the internet: <URL: https://watermark.silverchair.com/bbv066.pdf?> 17 Pages (696-712) (Year: 2015).*

(Continued)

*Primary Examiner* — Anibal Rivera
(74) *Attorney, Agent, or Firm* — Buckley, Maschoff & Talwalkar LLC

(57) ABSTRACT

A system includes a model repository comprising a plurality of models respectively being adapted to perform, when used by an analytical program, a computational task, in which a first database table is created in the database, the first database table having a predefined table structure that corresponds to the analytical program, a best-model of the plurality of models is stored in the first database table, and a request of a client device to perform the computational task and comprising input data is received. If the received request does not comprise a model-ID, the analytical program reads the model currently stored in the first table and uses the read model for performing the computational task on the input data. If the received request comprises a model-ID, the analytical program creates a second database table having the predefined table structure in the database, reads a model associated with the model-ID from the model repository, (Continued)

stores the read model associated with the model-ID in the second table, and uses the model read from the second table for performing the computational task on the input data.

19 Claims, 3 Drawing Sheets

(51) Int. Cl.

| | | |
|---|---|---|
| *G06K 9/62* | (2006.01) | |
| *G06F 16/28* | (2019.01) | |
| *G06F 16/22* | (2019.01) | |
| *G06N 20/00* | (2019.01) | |
| *G06F 9/48* | (2006.01) | |
| *G06F 16/26* | (2019.01) | |
| *G06F 16/2453* | (2019.01) | |
| *G06F 16/21* | (2019.01) | |

(52) U.S. Cl.
CPC .......... *G06F 16/284* (2019.01); *G06F 16/288* (2019.01); *G06N 20/00* (2019.01); *G06F 9/5027* (2013.01); *G06F 16/211* (2019.01); *G06F 16/24542* (2019.01); *G06F 16/26* (2019.01)

(58) Field of Classification Search
CPC ............. G06F 16/24542; G06F 16/211; G06F 9/4806; G06F 9/5027; G06N 20/00; G06N 20/20
See application file for complete search history.

(56) References Cited

U.S. PATENT DOCUMENTS

| | | | | |
|---|---|---|---|---|
| 2014/0189702 | A1* | 7/2014 | Yan | G06F 9/5027 |
| | | | | 718/104 |
| 2014/0189703 | A1* | 7/2014 | Gilder | G06F 9/5027 |
| | | | | 718/104 |
| 2016/0055044 | A1* | 2/2016 | Kawai | G06F 11/3082 |
| | | | | 714/26 |
| 2016/0275073 | A1* | 9/2016 | Poon | G06F 40/30 |
| 2017/0212942 | A1* | 7/2017 | Boileau | G06F 16/26 |
| 2018/0018579 | A1* | 1/2018 | Xu | G06N 20/20 |
| 2018/0081912 | A1* | 3/2018 | Suleiman | G06F 16/215 |
| 2018/0083833 | A1* | 3/2018 | Zoll | H04L 41/069 |
| 2018/0247325 | A1* | 8/2018 | Melzer | G06Q 30/0206 |

OTHER PUBLICATIONS

"Communication: Extended European Search Report", dated Mar. 1, 2018 (Mar. 1, 2018), European Patent Office, for European Application No. 17189250.8-1231, 7pgs.

* cited by examiner

MODEL-BASED ANALYSIS IN A RELATIONAL DATABASE

CROSS-REFERENCE TO RELATED APPLICATIONS

The present application claims priority to EP Application No. EP 17189250.8, filed Sep. 4, 2017, the contents of which are incorporated herein in their entirety for all purposes.

BACKGROUND

Machine learning program logic is capable of learning from data without being explicitly programmed. Machine learning algorithms can learn from and make predictions on data, thereby overcoming the following of strictly static program instructions through automatically building a model from training data. Machine learning is employed in a growing number of computing tasks where designing and programming explicit algorithms with good performance is difficult or infeasible. Example applications include applications in the field of computer-aided drug design (CADD), the screening of drug candidates and target molecules, detection of network intruders or malicious insiders working towards a data breach, image analysis and many others.

In the field of virtual drug screening, as described for example in US patent application US20140297199 A1, Support Vector Machines (SVMs) have become a commonly used machine learning algorithm for identifying new drug candidates (potentially active compounds) in a library of chemical structures and molecules. Typically, the training of the models is performed on large amounts of data as the quality of a predictive model typically correlates with the amount of training data used.

In virtual drug screening as well as in many other application scenarios, a great number of predictive models need to be trained and evaluated until a sufficiently accurate model is generated that can be used for identifying a promising object, e.g. a drug candidate. Often, several thousand or even more predictive models need to be defined, trained and evaluated, whereby the structure and parameters of the created models vary greatly to increase the probability that a good predictive model can be identified. The storing and management of large number of models therefore is a bottleneck in many model-based prediction use case scenarios like drug screening.

DETAILED DESCRIPTION

Figure 1:
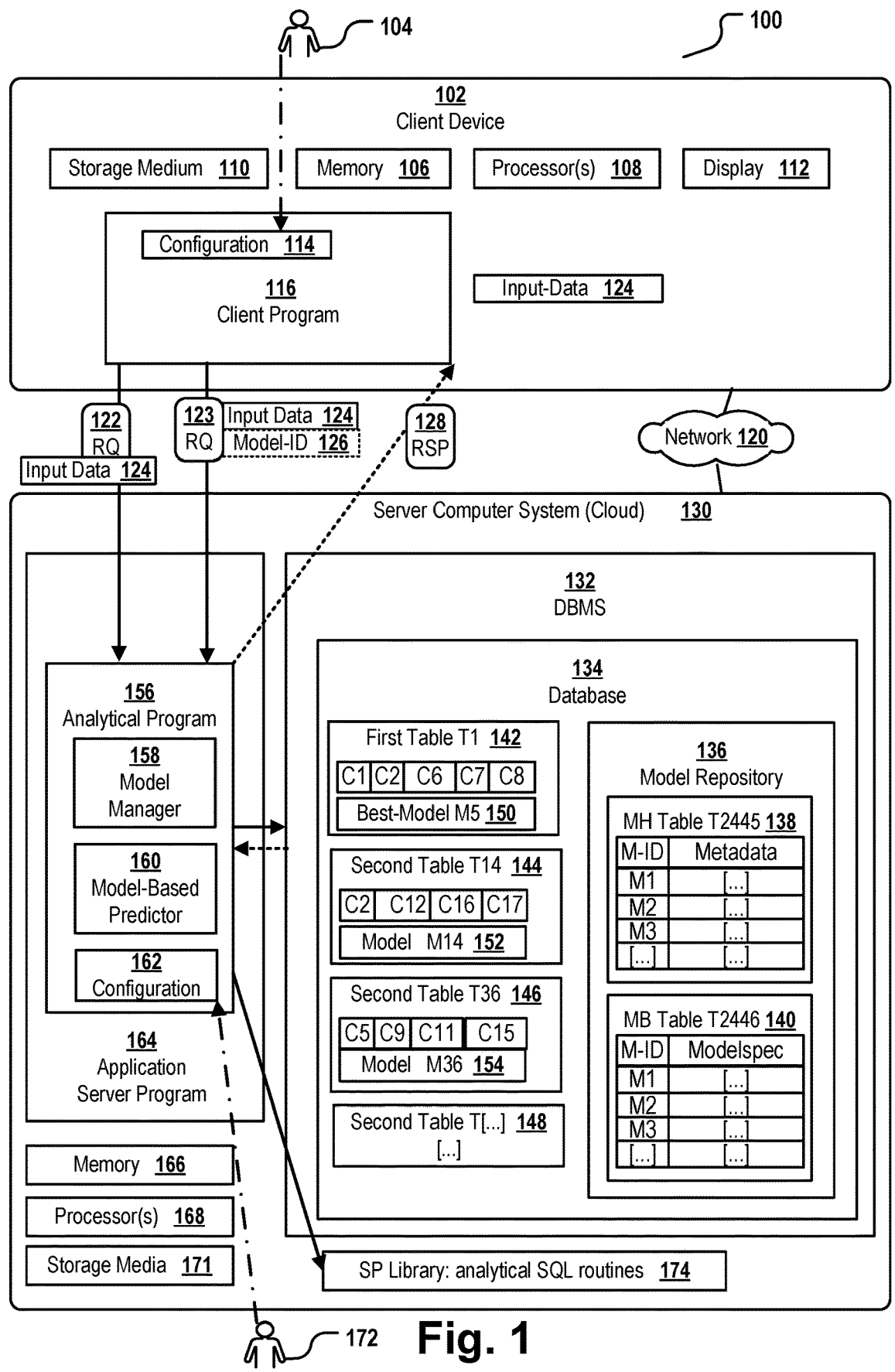
FIG. 1 is a block diagram of a system architecture to provide model-based prediction according to some embodiments.

The following description is provided to enable any person in the art to make and use the described embodiments. Various modifications, however, will remain readily-apparent to those in the art.

It is an objective of the presently-described embodiments to provide an improved method, system and computer program product as specified in the independent claims. Embodiments can be freely combined with each other if they are not mutually exclusive.

In one aspect, embodiments relate to a computer-implemented method for model-based analysis in a relational database. The method comprises:

accessing a model repository comprising a plurality of models respectively being adapted to solve, when used by an analytical program, a computational task, the model repository comprising a best-model, the best-model being the one of the plurality of models being the best suited for solving the computational task;

creating a first database table in the database, the first database table having a predefined table structure that corresponds to structural requirements of the analytical program;

reading the best-model from the model repository and storing the best-model in the first database table, receiving, by the analytical program, a request of a client device to solve the computational task, the request comprising input data;

the analytical program determining if the request comprises a model-ID;

if the received request does not comprise a model-ID, the analytical program reading the model currently stored in the first table and using the read model for performing the computational task on the input data;

if the received request comprises a model-ID,
the analytical program creating a second database table in the database; the second database table has a predefined table structure that corresponds to structural requirements of the analytical program;
the analytical program reading the identified model from the model repository;
the analytical program storing the read identified model in the second table; and
the analytical program using the model read from the second table for performing the computational task on the input data;
the analytical program returning a result of the performing of the computational task to the client device.

Said features may be beneficial, in the field of computer-aided drug design and also in other technical domains, as it allows to store and manage a huge number of models in a database context in a resource saving manner. In particular, CPU capacity, storage space and/or memory can be saved because the tables for storing any model except the best-model are created in response to a model-specific request only. Thus, client requests for solving a computational task can be processed based on a huge number and variety of models in an efficient manner with reduced computational overhead because the tables to be used to store any model except the "best" model are created dynamically in response to a request and not by default.

In many prior art systems, the structural diversity of predictive drug design models (e.g. the use of different numbers and types of hyperparameters and/or the use of different model architectures for different models) and the huge number of models corresponding to different subsets of model parameters (e.g. molecule size, molecule location, molecule class, etc.) often precluded the storing of models in a relational database context, because a relational database requires its tables to have a defined structure. Storing a large number of models, including structurally diverse models, in a "one fits all" table often had the disadvantage that more storage space was consumed than actually necessary, as the largest model defined the size of the "one fits all" table. Even in case of identical model structures, the storing and management of models in a relational database context according to some prior art systems consumed large amounts of storage, CPU and memory. Therefore, even in case the models had similar or identical structure, many prior art systems stored the predictive models outside of a relational database context, e.g. as files in a file directory structure. This was often connected with further downsides, e.g. the necessity to parse the models based on an unstructured or semi-structured input format before they were actually used for performing a computational task.

Some embodiments of the invention may allow to save CPU resources: the totality of models can be stored in an arbitrary, non-structured format in a "model repository". Thus, any model format used by the model generation software can be used for storing the models at first hand. Tables are created in the relational database selectively for the best-model irrespective of a client's request and for each of the other models which are explicitly specified in a client's request in response to said request. Often, automated modeling approaches in the field of virtual drug design but also in other technical domains generate a large number of models, e.g. several 1000, several 10,000 or even several 100,000 models, but typically there is only one single or a small number of models which are "best" models. By creating the second table for a particular model dynamically in response to and in dependence on a request for storage space in the DBMS that is to be reserved for a database table and CPU power necessary for creating a new table in the relational database can be saved.

In a further beneficial aspect, the structure of the first and second tables corresponds to the structural requirements of the analytical program that will consume the models for performing the computational task requested by the client. By storing a model that was originally generated and stored in a non-structured format (or in a format that could not be processed efficiently by the analysis logic) in a predefined table structure complying to the requirements of the analysis logic, embodiments of the invention may allow the implementation and use of an analysis logic in the context of a relational database that is able to quickly identify and retrieve each model and model component without expensive parsing operations.

For example, the model repository may comprise several thousand SVM models for virtual drug screening. The analytical program may expect to find some metadata of each model in columns 1-3, may expect n hyperparameter values in the columns 4, 5, . . . , n+3 for each model of the SVM model type, may expect one or more binaries or model architecture definitions in columns n+4 and n+5 and may expect an indication of a model-type ID in column n+6. Depending on the embodiment, the analysis logic may have different requirements regarding the table structure in which a model is stored for each model type or even for each individual model. By providing models in a structured manner in accordance with requirements of the analysis program, the consumption of CPU resources for parsing models may be reduced. For example, the models in the model repository may be specified as JSON file, as XML file or as JSON or XML string. Typically, those models consume lots of storage space, e.g. because also the delimiters like XML tags have to be stored. Moreover, the parsing of JSON or XML models by a model-based analytical program consumes more processing time than the retrieval of specific model parts from specific table columns and table records in the context of a relational database, because the relational database allows the use of indices and efficient search trees.

Thus, as the tables for all models except the best-model are generated in response to a request, CPU resources, storage resources and/or memory resources are saved. The best-model will in most cases be the best-suited to process the requested computational task. Only in case a client explicitly requests the analysis logic to perform the computational task based on a different model indicated in the request, a table for the requested model is created. Thus, although there may be several thousand models for a particular task in the model repository, there may exist only one or a few tables in the relational database comprising a respective model.

According to some embodiments, the models in the model repository comprise different numbers and types of hyperparameters. For example, the model repository can comprise SVM models and neural network models. The data format used for storing the models in the model repository is the same for all models irrespective of the number and type of hyperparameters contained in a model. The table structures of the first and second tables depend on the number and/or type of hyperparameters in the models. In addition, or alternatively, the table structures of the first and second tables depend on the number and/or type of model parameters.

This may be advantageous in particular in the context of automated model generation and in the field of virtual drug design where automated model generation is commonly applied. The automatically generated models can be stored into the model repository without having to adapt the structure of the model repository to the multitude of different model structures, model parameter sets and hyperparameter sets. Only the frequently used best-model and the models individually requested by a client are processed and stored in a structured data format that may allow for efficient model parsing, hyperparameter retrieval and that may allow for the use of model components by SQL commands and stored procedures that may be part of or may be called by the analytical program when using a model for performing the requested computational task.

Many state of the art approaches for automated or semi-automated model generation in the field of virtual drug design are known. For example, Wang et al. obtained 86% of accuracy in the classification of hERG potassium channel inhibitors for the heuristic choice of the SVM parameters (Wang M, Yang X-G, Xue Y. Identifying hERG potassium channel inhibitors by machine learning methods. QSAR Comb Sci. 2008; 27(8):1028-1035. doi: 10.1002/qsar.200810015). Hamman et al. (Hammann F, Gutmann H, Baumann U, Helma C, Drewe J. Classification of cytochrome P450 activities using machine learning methods. Mol Pharm. 2009; 33(1):796-801) suggested to evaluate the cytochrome P450 activities using grid search based SVM parameters optimization. It has been observed that classification efficiency can change dramatically for various parameters values. In recent years, Bayesian optimization (Swersky K, Snoek J, Adams R P (2013) Multi-task bayesian optimization. In: Advances in neural information processing systems, vol 26. Lake Tahoe, pp 2004-2012 and Snoek J, Rippel O, Swersky K, Kiros R, Satish N, Sundaram N et al (2015) Scalable Bayesian optimization using deep neural networks. arXiv preprint Xiv:1502.05700) and random search-based selection (Bergstra J, Bengio Y. Random search for hyper-parameter optimization. J Mach Learn Res. 2012; 13(1):281-305) have become more popular for optimizing SVM hyperparameters in the search for bioactive compounds. Most of these approaches provide a plurality of different models having different hyperparameters and different hyperparameter values which would consume lots of storage space and RAM if each model would directly be stored in a respective database table.

According to some embodiments, the model repository has a generic data format not suited for storing individual models in accordance with the requirements of the analytic program. Preferably, the data format used for storing models in the model repository is also independent of the number and type of components of the stored model, e.g. the number and type of hyperparameters, hyperparameter values, model parameters, the number and type of layers of neural network architectures, etc. For example, the model repository may be a file directory comprising models stored as individual XML or JSON files. According to other embodiments, the model repository consists of two database tables: a metadata table for storing model metadata such as model-ID, model name, author, model type, etc., and a content table which comprises a specification of the model in a generic data format, e.g. in JSON format, as a list of property-value pairs, in a binary format, etc. The best model for solving a computational task that is stored in the model repository has assigned a best-model-label or flag.

Depending on the embodiment, the best-model is identified manually, semi-automatically or automatically. In preferred embodiments, the models are generated automatically. This may have the advantage that a greater number of models can be trained and evaluated. For example, predictive modeling for drug screening and classification may comprise the definition of a set of 12 model parameters P1-P12 (e.g. presence of a particular chemical group like amino group, SH groups, hydrophobicity, molecule size, etc.) suspected to be of predictive relevance for a drug classification problem (e.g. classifying a molecule in "drug candidate", "no drug candidate"). These model parameters may have assigned weights which are modified during the training phase of model generation. The model creation may comprise selecting a first sub-set of these model parameters {P1, P2, P5, P6, P11}, e.g. 5 parameters, for which a first set of models is to be created. In addition, further subsets having the same or a different number of model parameters may be used for creating further, second models. For example a second subset comprising model parameters {P2, P3, P4, P5, P9} and a third subset comprising model parameters {P1, P8, P9, P10, P12} may be created. It is also possible that the number of model parameters per sub-set differs. For example, a fourth sub-set could comprise the model parameters {P2, P4, P5, P11}. In some embodiments, any possible combination of model parameters and any possible sub-set size may be selected as a respective sub-set of parameters used as basis for model generation. During the training phase, for a given model parameter set or subset, a plurality of models comprising a unique combination of model parameter values may can be generated automatically. For example, the training phase could return a model comprising the following pairs of model parameters and model parameter values: {P2="V1", P4="V2", P5="V3", P11="V4"} and could return a further model having the parameter values: {P2="V7", P4="V8", P5="V9", P11="V13"}.

In addition, or alternatively, each model may comprise one or more hyperparameters and a unique combination of hyperparameter values and model parameters. For example, for a k-means clustering model type, there may exist one hyperparameter "k", whereby the hyperparameter can have assigned either the hyperparameter value "1", "2", "3", "4" or "5". In addition, each model may comprise a particular combination of model parameters whose values are determined during the training phase. For example, for the k-means clustering model mentioned above, five different hyperparameter values specified at design time may be combined during the training phase with many different parameter values obtained during the training phase, thereby increasing the number of models to be evaluated.

As can be inferred from the given examples, the number of models may be huge: models may differ from each other in respect to the number and type of hyperparameters and hyperparameter values. In addition, or alternatively, models may differ from each other in that during the training phase, many different combinations of model parameter values are learned. Providing the complete set of models generated e.g. for a drug screening assay may therefore constitute a substantial technical challenge to any IT infrastructure.

The selection of promising model parameters and hyperparameter values requires many labor-intensive manual iterations that can be difficult even for computer scientists and specialists in the respective domain, e.g. molecular biologists for drug screening. Often, it is therefore preferable to simply add a model parameter to the set of parameters used for model generation even in case the model parameter is assumed not to be of predictive relevance. Likewise, it may be preferable to simply assign many different hyperparameter values to a particular hyperparameter even in case some of them will likely not provide a good/highly accurate model. Then, different combinations of suitable model parameter values may automatically be identified and assigned to the respective model parameters during training. Thus, a large number of models is generated automatically or semi-automatically. These models are later automatically evaluated, e.g. by comparing the predictions made by the respective model with a gold standard. Thus, in case a model comprises two hyperparameters (e.g. for a given type of SVM kernel, the regularization strength C or the width of the RBF kernel $\gamma$) respectively having assigned 100 different hyperparameter values, 100×100 different models can be created. During the training phase, the number of models may be further expanded by assigning model parameter values to model parameters. Thus, a huge combinatorial space of hyperparameter value and/or model parameter value combinations is generated that can be used as a basis for identifying the best-model. Hyperparameters are standard components of SVM models and neural network models, but are also used in other types of predictive models.

For example, different hyperparameter values can be defined for the regularization strength C and/or for the width of the kernel $\gamma$ in the context of SVM-based drug screening, (see for example Czarnecki W M, Podlewska S, Bojarski A J. Robust optimization of SVM hyperparameters in the classification of bioactive compounds. Journal of Cheminformatics. 2015; 7:38. doi:10.1186/s13321-015-0088-0). Each of the generated models is automatically fed to an analytical program that uses the model for predicting, for a training dataset, the result of a computational task, e.g. a classification or prediction task. The result generated by each model is then automatically compared against a known true result for identifying the one of the models whose prediction is the most similar to the annotated true result. For example, a Bayesian and random search optimization of SVM hyperparameters or a grid search and heuristic-based approaches for classifying bioactive compounds can be used. A global analysis of classification accuracy obtained for different methods for SVM parameters optimization is described, for example, in Czarnecki W M et al mentioned above). An analysis of the optimization of deep neural networks hyperparameters in the field of virtual drug design is described e.g. in Koutsoukas A, Monaghan K J, Li X, Huan J. Deep-learning: investigating deep neural networks hyperparameters and comparison of performance to shallow methods for modeling bioactivity data. Journal of Cheminformatics. 2017; 9:42. doi:10.1186/s13321-017-0226-y. According to embodiments, the analytical program requires each of the plurality of models to be stored in a relational database table in accordance with a predefined, model-specific table structure. For example, a particular analytical program logic may expect each hyperparameter value of a model being stored in a respective column that corresponds to the hyperparameter. Embodiments of the invention may be particularly suited in cases where the model-based analytical program logic has specific structural requirements in respect to the models, e.g. to reduce parsing time, as the storing of a copy of the model in a respective table having the required format ensures that the model can be interpreted by the analytical program irrespective of whether the model was originally generated in XML, JSON or any other format. Thus, as every model may be stored in its own format, a large flexibility of the model based analysis is achieved. In other embodiments, the models in the model repository may belong to one or more model types, e.g. SVM models, neural network models, Bayesian models, etc. and each of the model types has assigned a respective table structure to be used for storing a respective model, whereby all models of the same type share the same table structure.

According to embodiments, the first database table is created and the copy of the best-model is stored in the first database table before, during or after the instantiation of the analytical program and before the request is received. For example, an operator of a server that hosts the analytical program may configure the analytical program such that a particular one of the models in the model repository is identified as the best-model to solve a particular computational task. When the analytical program is instantiated on the server, or in response to an explicit user action of the operator, the analytical program identifies the table structure associated with the best-model and creates the first table in accordance with the identified table structure. Thus, the first table is created independent of and before a request of a client for performing a model-based analytical computational task is received by the server. In case the client explicitly requests the use of a different model, the analytical program identifies the table structure of the requested model, creates a "second" table selectively for the requested model and stores a copy of the requested model in said second table. For each further request of the client that comprises an indication of one of the models in the model repository, a respective second table is created and used for storing the model indicated in the request.

Typically, most of the clients will not indicate any model in their request for performing a particular computational task, e.g. a classification or a prediction. The clients thus may rely on the configuration of the operator of the server computer system who configures the analytical program such that the one of the models that was identified as the best-model is stored in a respective first table, e.g. upon program instantiation. Only in the rare cases when a client explicitly requests the server to perform the task based on a different model, a respective second table is created. Thus, the table creation of thousands of tables can be avoided that will likely not be used. Embodiments allow a client to select different models on a per-request basis. For example, in case the client submits some input data that is known to deviate from "standard" input data in respect to some aspects, the client may explicitly chose a model that is known or suspected to generate more accurate results for this "non-standard" input data than the "best-model". For example, in case the best model was generated and identified to be the "best-model" for drug screening based on a molecule library with a "normal" molecule size distribution, but a particular client uses an input dataset that solely or predominantly comprises small molecules, another one of the models in the repository that was trained based on another dataset reflecting small molecules sizes may be more accurate. Embodiments of the invention may allow any client to flexibly and dynamically choose the model to be used for a particular computational task for each request and for each input dataset separately.

According to embodiments, each of the models in the model repository has assigned a respective table structure selectively adapted to store said model in a structured format, whereby the structured format corresponds to and is in compliance with structural requirements of the analytical program. The first table is created in accordance with the table structure assigned to the best-model. The creation of the second table is performed selectively in response to receiving the request and comprises: dynamically identifying the table structure assigned to the one of the models identified by the received model-ID, and creating the second table in accordance with the identified table structure.

According to embodiments, each of the models in the model repository has assigned a model type. Each of the model types has assigned a table structure selectively adapted to store models of said model type in a structured format that corresponds to structural requirements of the analytical program. The first table is created in accordance with the table structure assigned to the model type the best-model belongs to. The creation of the second table comprises: in response to receiving the request, the analytical program dynamically identifies the model type of the model indicated in the request, identifies the table structure assigned to the identified model type, and creates the second table in accordance with the identified table structure. Then, the identified model is read from the model repository and stored in the created second table in a structured form. For example, the model type may be one of "SVM", "Neural network", "Bayesian" or any other type of model.

According to other embodiments, the method further comprises automatically creating the plurality of models by applying a machine learning logic on training data; automatically analyzing the plurality of models for identifying the best-model, the best-model being the one of the plurality of models being the best suited for solving the computational task; and storing all created models in the model repository. For example, the automated model creation may comprise defining an algorithm which is adapted to solve a prediction problem. The algorithm comprises a set of hyperparameters and model parameters, whereby the hyperparameter values can be set automatically, semi-automatically or manually. In addition, or alternatively, the automated model creation may comprise defining a set of model parameters with an optional default model parameter value, whereby the respective model parameter values of a model are to be learned during the training.

For example, in a virtual drug screening approach that uses neural networks as the analytical program, the hyperparameters may comprise parameters like "number of layers" (typically, 1, 2, 3 or 4), "backpropagation learning rate, L2 weight decay and the like.

This step may be performed manually. Then, untrained models are created by automatically assigning, to each of the hyperparameters, one of the hyperparameter values and initializing the model with different sets of hyperparameter values. Then, each of the models is trained on a training dataset. Each model may comprise further parameters ("model parameters") whose values are modified during the training process such that an error function indicating a deviation of a result generated by the model and the "known truth" as annotated in the training dataset is minimized. The resulting model may comprise a particular selection of hyperparameter values and/or model parameter values obtained during the training phase. Finally, all models can be applied on a further dataset ("test dataset"). Often, a sub-set of an annotated dataset not used as training set is used as test dataset. For example, cross validation can be performed during training by splitting the annotated dataset into a training set and a validation set. This split is typically performed more than once, e.g. 10 times ("10-fold cross validation") in order to prevent overfitting. Finally the model is in addition evaluated on an independent test dataset. Alternatively, the predictions generated by the models can be compared with a predefined evaluation matrix of known, true results. The evaluation is preferably performed automatically and the model whose output is the most similar to the "known truth" indicated in the evaluation matrix/test dataset is selected as the best-model for a particular computational task, e.g. drug screening, prediction of disease progression, and the like.

In case multiple models have the same accuracy, some embodiments automatically perform a further evaluation step in order to identify a single one of the models that has some benefit over the other models with the best accuracy. For example, in case two models have the same accuracy, the one that performs the computational task fastest is identified as the "best-model". Alternatively, the one of the highest-accuracy models that consumes less storage space is identified as the "best-model".

According to some embodiments, the models in the model repository comprise models generated on different training datasets or on different versions of the same training dataset. Storing all models in the model repository and enabling a client to selectively perform an analysis or prediction based on an individually selected model may be advantageous as it is possible to supplement the model repository with newer, improved versions of a model, e.g. with models having been trained on an enlarged or better annotated training dataset without having to replace or overwrite old models. Thus, a client has the option to continue using the "old" best-model or may simply use the model that may be currently be selected by an operator of the server to represent the best-model.

According to some embodiments, the plurality of models comprises at least two different models referred to as "first model" and "second model". The first model comprises a first set of hyperparameters and has assigned a table structure adapted to store the first set of hyperparameters in a structured format. The second model has a second set of hyperparameters and has assigned another table structure adapted to store the second set of hyperparameters in a structured format. For example, the model repository may comprise models representing different modeling algorithms, e.g. SVM models and neural network models, and may comprise different types and numbers of hyperparameters. Thus, the number and type of model parameters and/or the numbers, types and values of the hyperparameters in the first and second model can differ from each other. The assigned table structure respectively assigned to the first and second model is used for creating the second table in case the model-ID of the request identifies the first or second model.

Some embodiments may allow a server to enable any client to use a particular one of 10,000 or 100,000 different models, e.g. different SVM and/or neural network models, within the context of a relational database without creating bottlenecks and with a very small storage and memory footprint. A huge variety of hyperparameter values may be specified in a first step and the values of a huge variety of model parameters may be modified in the training step for creating different models with different sets of model parameters and hyperparameter values and for identifying the best model within the totality of automatically generated models. As a table is created for any non-best-model only in response to a client's explicit request, storage capacity is saved because all other non-best models are not read from the model repository and are not stored in a respectively created second database table.

According to embodiments, the relational database is maintained by a database management system (DBMS). The analytical program comprises analytical SQL routines or a call to analytical SQL routines. The performing of the computational task comprises executing, by the DBMS, the analytical program routines. The analytical SQL routines are adapted to access specific columns of the first or second table from which the model used by the analytical program is read.

Using analytical SQL routines within a relational DB context for performing the model-based computational task may have the advantage that SQL routines typically are much faster and can process more data than program routines of higher-level application programs. Moreover, it is not necessary to export data from a database to a database-external application program. By storing the models in database tables in a defined manner, the process of reading, interpreting and using the models and model components by program routines of the analytical program logic may be particularly fast.

According to some embodiments, the input data specified in a client's request is directly forwarded to the analytical program by the server computer system without an intermediary of a database table. This may be beneficial for small input datasets provided by a single query as the computational overhead of table creation may be avoided.

In other embodiments, the input data is stored in a database table, preferably a temporary database table, before it is read as input by the analytical program. The relational database is maintained by a DBMS. The analytical program comprises analytical SQL routines or a call to analytical SQL routines. The method comprises storing the received input data in one or more "input" database tables of the relational database. The performing of the computational task comprises executing, by the DBMS, the analytical program routines, the analytical SQL routines being adapted to access specific columns of the tables comprising the input data. For example, the analytical SQL routines can be provided in the form of stored procedures, e.g. a library of stored procedures that is installed in the DBMS. For example, the library can be a Predictive Analysis Library (PAL). It may comprise functions that can be called from within SQLScript procedures to perform analytic algorithms. For example, a virtual drug screening application may need to perform a cluster analysis in a huge temporary table with thousands of drug candidates. It may not be possible (or may be very slow) to perform the analysis in procedure DBMS-external application program, because the routines in the application layer may operate on data objects created in the application layer and may not be able to make use of the highly structured data format of data stored in a relational database. Transferring large tables to the application layer, e.g. an application server software hosting a K-means clustering algorithm, is also costly. The Predictive Analysis Library (PAL) defines functions that can be called from within SQLScript procedures to perform analytic algorithms. Preferably, the library includes predictive analysis algorithms in various data-mining categories comprising clustering, classification, regression, association, time series, pre-processing, statistics, network analysis, and others.

Said features may be beneficial as the analytical SQL routines can be performed within a relational DB context highly efficiently, in particular if the input data is provided in table form (with appropriate indexation). Thus, also very large molecule libraries and a large number of predictive models can be tested highly efficiently. Analytical SQL routines performed within a relational DB context are much faster than program routines of higher-level application programs. Moreover, it is not necessary to export data from DB to the application context.

According to some embodiments, the analytical program is a plug-in or add-on or an integral component of a DBMS that maintains the relational database. According to embodiments, the plurality of models comprise more than 100 models, in particular more than 5000 models. However, in many application scenarios, an even higher number of models may be used, e.g. 100,000 or more models.

According to some embodiments, the first table is a static database table and each dynamically created second table is a temporary database table. This may be advantageous, because the lifetime of temporary tables is—contrary to the lifetime of static tables—confined to the session of a client. Thus, once a client's session is terminated, the second table(s) created in response to specific model requirements of a client are deleted. Typically, most of the clients will use the best-model so it is unlikely that any client could make re-use of the second table selectively created for storing the desired model for a specific client. As the temporary tables will be deleted automatically by the DBMS once a session has expired, storage space and memory is saved.

According to some embodiments, the first table is accessible by multiple client devices concurrently, the second table being created within a session between the server computer system and the client device and being inaccessible and invisible by other client devices. This may be advantageous in the context of maintaining a large number of models, because all models except the most frequently used "best-model" are stored in a temporary table and thus in a session context that hides the table from other clients. This prevents name space conflicts of the dynamically created second tables, because the second tables cannot be "seen" by other clients. Only the best-model is stored in a static table which is globally accessible by multiple clients. Typically, the model repository comprises only a single best-model or a single best-model per model type. Thus, the creation of a static table for each best-model will result in the creation of only a single or of very few static tables with a global name space used by multiple clients and name conflicts can easily be avoided.

According to some embodiments, the relational database is maintained by a DBMS configured to repeatedly persist static tables in a non-volatile storage medium and to store temporary tables solely in a volatile storage medium, in particular RAM. For example, the DBMS can be SAP HANA, MySQL, PostgreSQL or the like. Said features may be beneficial as computational overhead and storage space consumption related to the persisting of tables to a non-volatile storage can be avoided for the second tables which will likely not be needed by any other client anyway. Thus, the dynamically requested non-best-models are read from the model repository and are stored in second tables which solely exist in the volatile main memory (RAM). Access to the main memory is particularly quick. To the contrary, the first table is loaded into the volatile main memory and is in addition persisted to a non-volatile storage medium. In some embodiments, the analytical program may create the first table the first time in RAM, store the best-model in the RAM-based first table and store the first table to a non-volatile storage medium.

According to embodiments, the analytical program receives a further request of the client device to solve the computational task. The further request comprises the input data and a model-ID of a further one of the models. Then, the analytical program identifies the further model and a further predefined table structure selectively adapted to store the further model in a further structured format and creates a third table in accordance with the further predefined table structure. Then, the analytical program reads the identified further model from the model repository, stores the read further model in the third table and uses the model read from the third table for performing the computational task on the input data. Then, the analytical program returns a further result to the client device, the further result being generated by the analytical program by performing the computational task with the further model.

Thus, the client may be enabled to select different models in different requests and to perform the same analytical task flexibly based on many different models. According to embodiments, the computational task is the classification of bioactive compounds. The plurality of models are support-vector-machine-models which may comprise many different hyperparameter values. The best-model is the one of the plurality of models which provides the most accurate classification of the bioactive compounds, e.g. in "drug candidate" or "non-candidate".

In a further aspect, the invention relates to a software program which, when executed by a processor, cause the processor to perform a method according to any one of the embodiments described herein. For example, the software program can be provided as a volatile or non-volatile computer-readable storage medium.

In a further aspect, some embodiments relate to a computer system comprising a server computer system. The server computer system comprises:

a network interface; the network interface is adapted for connecting the server computer system via a network to at least one client device; for example, the network interface can be an Ethernet or WLAN interface;

a model repository; the model repository comprises a plurality of models respectively being adapted to solve, when used by an analytical program, a computational task; the model repository comprises a best-model; the best-model is the one of the plurality of models which is the best suited for solving the computational task;

a DBMS that maintains a relational database; and an analytical program.

The analytical program is configured for:

creating a first database table in the database, the first database table having a predefined table structure that corresponds to structural requirements of the analytical program;

reading the best-model from the model repository and storing the best-model in the first database table, receiving a request of the at least one client device to solve the computational task via the network, the request comprising input data;

determining if the request comprises a model-ID;

if the received request does not comprise a model-ID, reading the model currently stored in the first table and using the read model for performing the computational task on the input data;

if the received request comprises a model-ID, creating a second database table in the database, the second database table having a predefined table structure that corresponds to structural requirements of the analytical program, reading the identified model from the model repository, storing the read identified model in the second table, and using the model read from the second table for performing the computational task on the input data; and returning a result of the performing of the computational task to the client device via the network.

According to some embodiments, the computer system further comprises the at least one client device and comprises at least one further client device. The analytical logic is configured to read the best-model from the first table in response to respective requests from multiple ones of the client devices and is configured to store and read models identified via model-IDs in a request in temporary tables that are created specifically for the session context of requests of individual ones of the client devices.

According to some embodiments, the computer system further comprises a learning framework. The learning framework is an application program.

According to some embodiments, the framework is configured for automatically or semi-automatically generating the plurality of models by applying untrained versions of the models on a training dataset, for storing the generated and trained models in the model repository and for interoperating with the analytical program logic such that the analytical program selectively reads models from the first or second table whose model type corresponds to the analytical algorithm type encoded by the analytical program logic. For example, the framework can be interoperable with multiple different analytical programs respectively being based on different types of analytical program logics, e.g. neural networks, SVMs, Bayesian networks, k-means clustering and the like. In case the framework receives a client's request for solving a computational task that corresponds to a particular one of the multiple analytical program logics, the learning framework is adapted to forward the request selectively to this particular analytical program being adapted to perform the requested computational task. For example, the particular application program can implement a neural network based analysis of a particular type, and the framework can ensure that the analytical application program selectively reads models from first and second tables which are based on a neural network architecture that can be interpreted by this particular analytical program.

According to embodiments, the learning framework comprises a graphical user interface (GUI) which enables a user to specify a plurality of hyperparameter values for one or more hyperparameters of a model and which enables a user to trigger the automated generation of models having different hyperparameter values. In addition, the framework enables a user to select a training dataset for automatically training the models and to select a test dataset for automatically evaluating the accuracy and optionally also the speed and/or CPU consumption of each of the generated models if applied on the test dataset. In addition, the framework can be configured for outputting, e.g. displaying, a model that was automatically identified as best-model to the user. The framework can enable the user to select the automatically identified best-model or a different, manually selected best-model and store the model-ID of the selected model in a configuration that is automatically evaluated for determining the best-model and its assigned table structure for creating the first database table in accordance with this table structure.

Preferably, the learning program is configured to interoperate with the analytical program by automatically providing each of the trained models to the analytical program for enabling the analytical program to train an untrained model on training data and/or to apply the trained models on test data.

Some embodiments of the invention are used in the field of predictive modeling, a sub-field of machine learning where even the model that is to be trained on the available data is defined, evaluated and selected automatically.

A "machine learning logic" as used herein is a program logic adapted to extract a model of an entity or a set of entities from training data that describes structural and/or functional aspects of the entities. The resulting models can be used for a wide variety of computational tasks related e.g. to prediction of a current or future state of an entity, of a simulation of the behavior of the entity, the classification of the entity, and the like. These models allow researchers, data scientists, engineers, and analysts to "produce reliable, repeatable decisions and results" and uncover "hidden insights" through learning from historical relationships and trends in the data.

A "hyperparameter" as used herein is a parameter whose values are set prior to the commencement of the learning process of a machine learning logic. For example, a hyperparameter can be the learning rate for training a neural network, the C and gamma hyperparameters (or some other parameters like the sigma parameter described e.g. in WANG, Wenjian, et al., 2003. *Determination of the spread parameter in the Gaussian kernel for classification and regression, Neurocomputing*, Volume 55, Number 3, October 2003, pp. 643-663) for support vector machines or the "k" in k-nearest neighbors. By contrast, the value of other parameters ("model parameters") is derived via training from the training data. A "model parameter" as used herein is a configuration variable of a model of a machine learning logic whose value is set to Null or a default value before training the model, whereby the value of the model parameter is modified during the training and are learned from the training data. They are typically not set manually by the practitioner and are typically saved as part of the learned model. A "model parameter" can be, for example, the weights in an artificial neural network, the support vectors in a support vector machine and the coefficients in a linear regression or logistic regression.

A "model" as used herein is a description of a system using concepts and language that can be interpreted by a machine learning logic. For example, the model can be a mathematical model, in particular a statistical model. The process of developing a model is termed modeling. The models are often used for performing a prediction ("predictive models") or a simulation. Models are used, for example, in the natural sciences (such as physics, biology, Earth science, meteorology) and engineering disciplines (such as computer science, artificial intelligence). A model may help to explain a system and to study the effects of different components, and to make predictions about a behavior. A statistical model is a class of mathematical model, which embodies a set of assumptions concerning the generation of some sample data, and similar data from a larger population. The assumptions embodied by a statistical model typically describe a set of probability distributions, some of which are assumed to adequately approximate the distribution from which a particular dataset is sampled. The probability distributions inherent in statistical models are what distinguishes statistical models from other, non-statistical, mathematical models.

An "analytical program" as used herein is a program logic configured to receive one or more models and some input data as input, to apply the received model on the input data and to return a result of applying the model. Depending on the model, the output can be, for example, a prediction, a simulation, a classification or the like. In some embodiments, the analytical program is implemented as a stand-alone software application program or as a module of a standalone software application program. For example, the software application program can be a web application that is configured to be deployed to an application server program and to be provided over a network to one or more clients. Alternatively, the analytical program can be implemented as a plug-in, add-on or integral part of a DBMS. Preferably, the DBMS and/or the plug-in, add-on or integral DBMS-part are hosted on a server computer system and can be accessed by one or more clients via a network, e.g. the internet or an intranet.

A "client device" or "client" as used herein is a computer system that comprises program logic adapted to send a request to the analytical program hosted on a server computer via a network connection. For example the client device can be a standard computer, a smart phone, a desktop computer, a notebook or any other data processing device that comprises a program routine adapted to submit a request for executing a computational task to the server computer system and to receive a response from the server. The client can comprise a client application program that is interoperable with the analytical program instantiated on the server computer system. For example, the analytical program can be implemented as Java enterprise application that is deployed to and instantiated in an application server software hosted on the server computer system. The client program can be a Java client program adapted to submit requests via a service interface, e.g. a web service interface, to the analytical program.

A "server computer" or "server computer system" as used herein is a computer system that hosts one or more application programs and makes the hosted programs available to multiple clients over a network, e.g. the internet. The server computer system can be a system of multiple distributed server computer systems having a common interface, thereby hiding the complexity of the distributed server computer systems from the clients. For example, the server computer system can be a cloud computer system that is configured to make the one or more application programs available to the clients via a cloud interface.

A "best-model" as used herein is a model that is the one of the plurality of models having been trained for solving a computational task that is the best suited for solving the computational task, e.g. in terms of accuracy or in terms of a combination of accuracy and performance.

A "database management system (DBMS)" as used herein is a software application designed to allow the definition, creation, querying, update, and administration of databases. Preferably, the DBMS comprises an SQL interface and allows clients to access and manage the data stored in the databases via SQL commands. Examples for DBMSs are SAP HANA, MySQL, PostgreSQL and others.

A "database" as used herein is a collection of electronic information ("data") that is organized in memory or on a non-volatile storage volume in the form of a particular, defined data structure which supports or is optimized for data retrieval by a particular type of database query. The data is typically logically organized in database tables. A database can in particular be a relational database, e.g. a column-oriented database or a row-oriented database.

A "static table" or "static database table" as used herein is a database table whose lifetime is independent from the duration of a session between the server computer and the client device. In preferred embodiments, a static table is adapted to be viewed and accessed by multiple clients concurrently.

A "temporary table" or "temporary database table" as used herein is a database table whose lifetime is limited to the duration of a session between the server computer and the client device. In preferred embodiments, a temporary table can be viewed and accessed selectively by the client who owns the session. Thus, when a second table is created as temporary table, the second table can only be accessed by the client whose request triggered the creation of the second table.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. According to some embodiments, the computational task is the classification of microscopic particles into various classes of debris. The plurality of models are support-vector-machine-models having different hyperparameter values or neural networks having different numbers of layers. The best-model is the one of the plurality of models which provides the most accurate classification of the microscopic particles into various classes of debris. The analysis of microscopic debris is frequently used in many industrial areas, e.g. microchip or wafer production.

According to further embodiments, the computational task is the assessment of the quality of a machine-translated text. The plurality of models are support-vector-machine-models having different hyperparameter values. For example, the plurality of models can be created by training a machine learning logic on training data comprising examples of good and bad machine translations from a source language (e.g. English) into one target language (e.g. French). Each example has assigned a label being indicative of the effort that was necessary to transform the machine-translation into a high-quality translation. Thus, this label acts as a quality measure. The best-model is the one of the plurality of models which (according to some KPI or evaluation metric) provides the most accurate assessment of the quality of a machine translation by predicting the correct effort. Flash memory is an electronic (solid-state) non-volatile computer storage medium that can be electrically erased and reprogrammed. The individual flash memory cells exhibit internal characteristics similar to those of the corresponding gates. Where EPROMs had to be completely erased before being rewritten, NAND-type flash memory may be written and read in blocks (or pages) which are generally much smaller than the entire device.

FIG. 1 shows a distributed computer system 100 comprising a server computer system 130 and at least one client device 102. The system 100 may be used for identifying one or more promising drug candidates in a library of several thousand molecules. The server computer system is implemented as a cloud computer system that provides model-based prediction based on a plurality of statistical models to a plurality of clients via the Internet 120.

For example, the user 104 can be a molecular biologist who has identified a set of proteins which are assumed to be potential drug candidates. The user has prepared an input dataset 124 comprising a description and a set of features for each of the identified proteins. The input dataset 124 is stored on a non-volatile storage medium 110, e.g. a hard disk, of the user's client device 102. The client device 102 can be, for example, a desktop computer, a notebook, a tablet computer or the like. The client device comprises one or more processors 108, a display 112, and a main memory 106. The client device further comprises a client application program 116 that is interoperable with an analytically program 156 hosted by the server computer system 130. The input data 124 having been manually or semi-automatically created by user 104 are stored in the storage medium 110. The user 104 may know that the cloud server 130 offers a remote service of predicting, based on some input data, whether or not the molecules described in the input data are likely drug or not. The client program 116 comprises a configuration 114 and an interface, e.g. a GUI, enabling the user 104 to configure if the prediction shall be performed based on a standard model used by the server computer system as "default" model or if the prediction shall be performed based on a model identified in the request.

The server computer system comprises a DBMS 132 which comprises one or more databases 134. A plurality of predictive models M1, M2, . . . , are stored in the model repository 136. In the depicted embodiment, the model repository consists of two database tables 138, 140. In the first repository table 138, a model identifier and meta-data of the model such as model name, model type, creator, creation date, number of hyperparameters or the like are stored. In the second model repository table 140, the specification ("body") of each model is stored in one or more respective table rows. For example, the specification can be stored as a string in XML or JSON format. The format used for storing models and the model repository typically requires a complex parsing operation in order to extract individual model parameters or parameter values.

In addition, the server computer system 130 hosts an analytical program 156 that is interoperable with the client program 116 and is able to receive service requests 122, 123, 170 from the client. In the depicted embodiment, the analytical program 156 is deployed to an application server program 164 such as JBoss or GlassFish. The analytical program comprises a configuration 162 and an interface allowing an operator 172 of the server system to specify which one of the models stored in the model repository is the best-model for solving a particular computational task. The commutation the task can be, for example, the identification of a promising drug in a molecule library.

The analytical program 156 further comprises a model manager module 158. The model manager module 158 is configured to evaluate, upon deployment and instantiation of the analytical program within the application server program 164, the configuration 162. The configuration 162 is a data structure in which the operator 172 has specified the best-model for drug classification and/or drug candidate identification. In the depicted example, the configuration 162 specifies that the model M5 is the best-model for the computational task of drug prediction. Thus, upon instantiation of the analytical program, the model manager module 158 identifies the best-model M5 in the model repository 136, identifies a table structure that is stored in association with the model M5 or in association with the type of the model M5 (here: the structure of table T1) and creates a first table 142 in the form of a static table in the database. The table structure with columns C1, C2, C6, C7, C8 is pre-defined and complies to structural expectations and requirements of the analytical program 156 when reading model M5 from a table. After the first table 142 was created, the model manager module reads a copy of the best-model M5 from the model repository and stores it in the first table. Thus, irrespective of any client requests, the first table is created and filled with a model as soon as the analytical program is instantiated on the server. In other embodiments, the creation of the first table may be triggered explicitly by the operator 172. Thus, after having instantiated the analytical program and before the first client request is received, the database 134 solely comprises a first table being filled with the best-model and does not comprise any second table 144, 146, 148, because the second tables are created only in response to the request of a particular client and exist only within the session context of that client.

The model manager module 158 is adapted to analyze each request received from a client for determining whether the request indicates a specific model that is to be used by the analytical program as basis for the prediction. If no such model is specified in the request, as is the case for request 122, the model manager retrieves the model that is currently stored in the first table 142 and provides it to the model-based predictor module 160. The model based predictor module 160 is configured to perform the prediction based on the model provided by the model manager module on the input data 124 contained in the client's request. The model that is read from the first table will be the best-model for solving the computational task in accordance with the specification in the configuration 162. In case the request comprises a model-ID for one of the models in the model repository, the model manager module accesses the model repository 136 and identifies a table structure associated with the identified and requested model or associated with the type of the identified and requested model.

For example, request 123 comprises a model ID 126 that is indicative of model M14. In response to receiving the request 123, the model manager module identifies a table structure associated with model M14, creates a second table T14 in the database 134, reads the model M14 from the model repository, parses the model and stores the parsed model components in a structured manner in the dynamically created second table 144. Then, at a later point in time, a further request 170 is received by the analytical program 156. The request 170 comprises input data 124 and a model-ID that is indicative of model M36. In response to receiving the request 170, the model manager module identifies a table structure associated with model M36, creates a further second table T36 in the database, reads the model M36 from the model repository, parses the model and stores the parsed model components in a structured manner in the dynamically created second table T36. After having identified the model that is to be used by the analytical program for serving the request of the client, and after having stored any requested non-best-model in a respective second table, the model manager module 158 forwards the model that is to be used to the predictor module 160. The predictor module 160 applies the model on the input data 124 for making a prediction, e.g. identifying one or more molecules in a molecule library which are promising drug candidates.

In some embodiments as depicted in FIG. 1, the predictor module program logic 160 comprises calls to a stored procedure library 174 which comprises one or more analytical SQL routines. In response to a call by the predictor module 160, the SQL routines are performed on the input data 124. The input data can be stored in temporary tables in the database 124. Thus, FIG. 1 depicts a cloud service architecture that flexibly allows a plurality of clients to remotely perform predictions based on a plurality of dynamically selectable models within a database context. Performing the predictions in the described manner in a database contexts may provide a huge performance gain compared to other systems, because the creation of tables for thousands of models which may never actually be used by any client is avoided and because in some embodiments the received input data is stored in a structured manner in temporary input tables such that fast, specially adapted analytical SQL routines 174 can be applied on the input data without having to export the data to a higher-level application program.

The models stored in the model repository can be created by executing a machine learning logic ("training procedure") T(Ii, Si, OTi) on input Ii using settings Si. The settings may be a particular set of hyperparameter values. The generated output OTi is a model Mi. The model is stored in a predefined format, preferably in a format that can be stored in a relational database. For example, each model can be stored in a model repository consisting of two tables, one for storing model metadata and one for storing one or more strings, the one or more strings specifying the model and its parameter values e.g. in XML or JSON format. Thus, the automatically generated model may have any structure and parameter value combination, the use of generic storage formats such as XML and JSON ensures that the model can be stored in the model repository within a relational database. The format used for storing each model in the model repository is independent of the structure of the model, e.g. is independent of the number and type of hyperparameters used.

Figure 2:
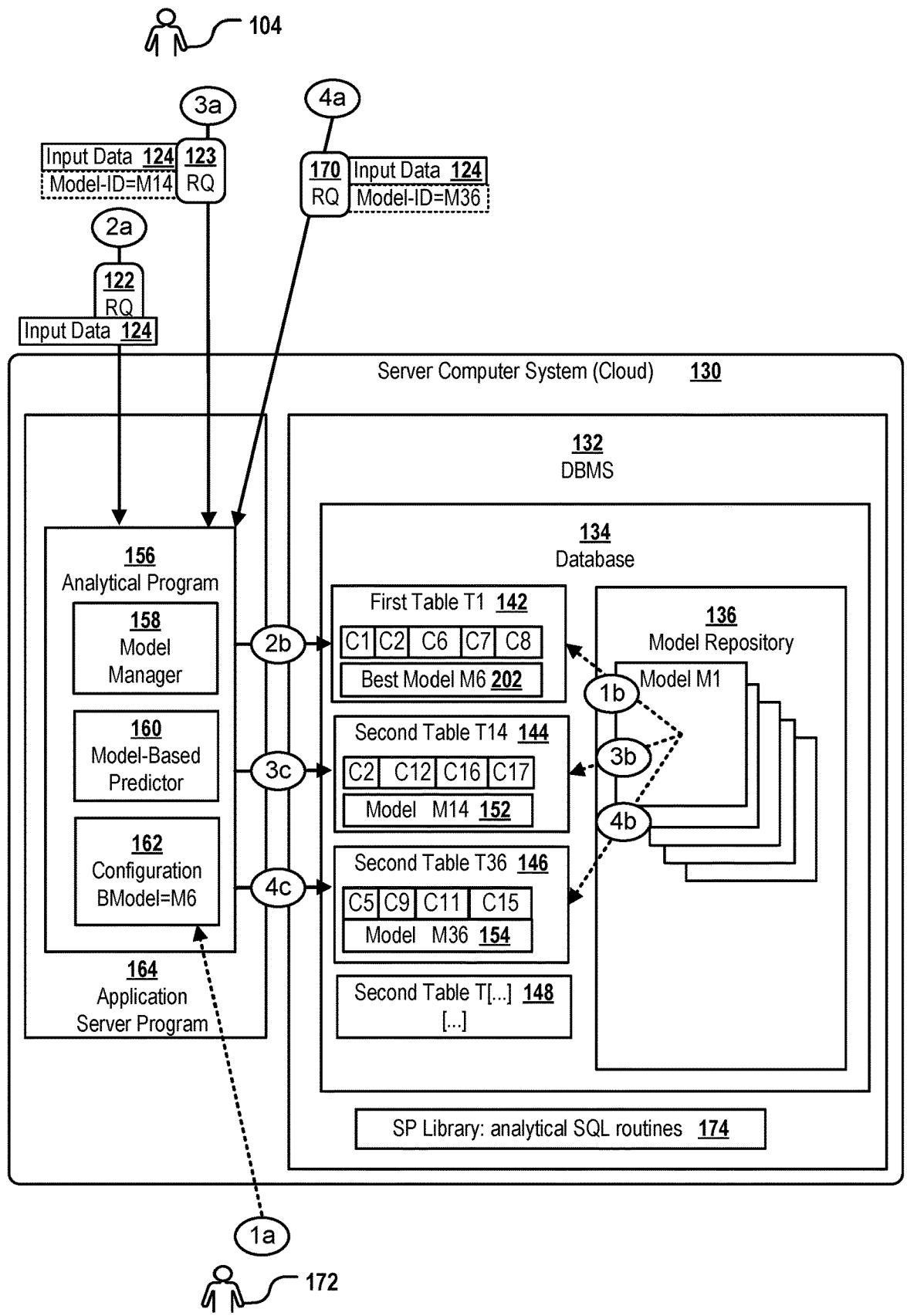
FIG. 2 is a block diagram illustrating operation of a system architecture to provide model-based prediction according to some embodiments.

FIG. 2 shows the DBMS server 130 and its response to different client requests 122, 123, 170 in greater detail. The computational steps triggered by each client request and also some operations triggered by an operator of the server computer system according to embodiments of the invention are described below:

Steps 1a-1b: Specifying the Best-Model Globally:

In step 1a, an operator (system administrator) 172 of the server computer system specifies in the configuration 162 the one of the models in the model repository that is the best-model for solving a particular computational task, e.g. the prediction of a suitable drug. The modification of the configuration can be implemented as a service request to the analytical program. In the depicted example, model M6 is specified as the best-model. This is preferably performed at design time of the analytical program 156, e.g. before the analytical program is deployed or re-deployed and instantiated.

In step 1b, e.g. upon instantiation of the analytical program 156, the model manager module 158 evaluates the configuration 162, identifies a table structure stored in association with the model M6 or with the model type of model M6, creates the first table 202 in accordance with this table structure, reads the model M6 as JSON string from the model repository, and stores the model in structured form in the first table. This is done just once for all clients to which the model-based prediction is offered.

Steps 2a-2c: Receiving a Request without a Model-ID:

In step 2a, the analytical program 156 receives a request 122 from the client device. The request comprises some input data but does not comprise any indication of the model that is to be used.

In step 2b, the model manager module 158 analyzes the request 122, determines that no model is specified in the request, and reads the model that is stored in the first table 142. In this case, model M6 is read from the first table. The model M6 can be, for example, a SVM model that is stored in a set of table rows. The model M6, as all other models described herein, can be generated by a machine learning framework such as, for example, SAP HANA PAL. The SAP HANA PAL may be used both for generating and training the models and for applying the generated models on input data.

In step 2c (not shown), the model manager module forwards the model M6 to the predictor module 160 which feeds the model M6 to a PAL prediction stored procedure 174, performs a prediction on the input data 124 provided by the request, thereby using the model M6 and the stored procedure. Finally, the result of the prediction based on model M6 is returned to the client device.

Steps 3a-3c: Receiving a Request with a Model-ID:

In step 3a, the analytical program 156 receives a request 123 from the client device. The request comprises some input data 124 and a model-ID of model M14. For example M14 may be an old version of model M6 or may be a model that is preferable in case the molecules specified in the input data are below a particular size threshold.

In step 3b, the model manager module 158 analyzes the request 123, determines that a model is specified in the request, and identifies a table structure stored in association with the identified model M14 or with the model type of model M14. Then, the model manager module creates a second table T14 in the form of a temporary table that can solely be seen and accessed by client 102 in the database, reads the model M14 identified in the request from the model repository 136, and stores the model M14 in the second table T14. For example, the DBMS can be SAP HANA and the second table can be created as a HANA temporary table.

In step 3c (not shown), the model manager module forwards the model M14 to the predictor module 160 which performs a prediction on the input data 124, thereby using the model M14 and optionally a stored SQL procedure. Finally, the result of the prediction based on mode M14 is returned to the client device. For example, the prediction can be performed within a session context whereby a dedicated portion of the memory is reserved for processing the request of the client.

Steps 4a-4c: Receiving a Further Request with Another Model-ID:

In step 4a, the analytical program 156 receives a further request 170 from the client device. The request comprises the same input data 124 as request 123 but indicates a different model (M36). In step 4b, the model manager module 158 analyzes the request 170, determines that a model is specified in the request, and identifies a table structure stored in association with the identified model M36 or with the model type of model M36. Then, the model manager module creates a second table T36 in the form of a temporary table that can solely be seen and accessed by client 102 in the database, reads the model M36 identified in the request from the model repository 136, and stores the model M36 in the second table T36. In step 4c (not shown), the model M36 is used for computing a prediction result by the analytical program as described for step 3c and a further result is returned to the client.

Figure 3:
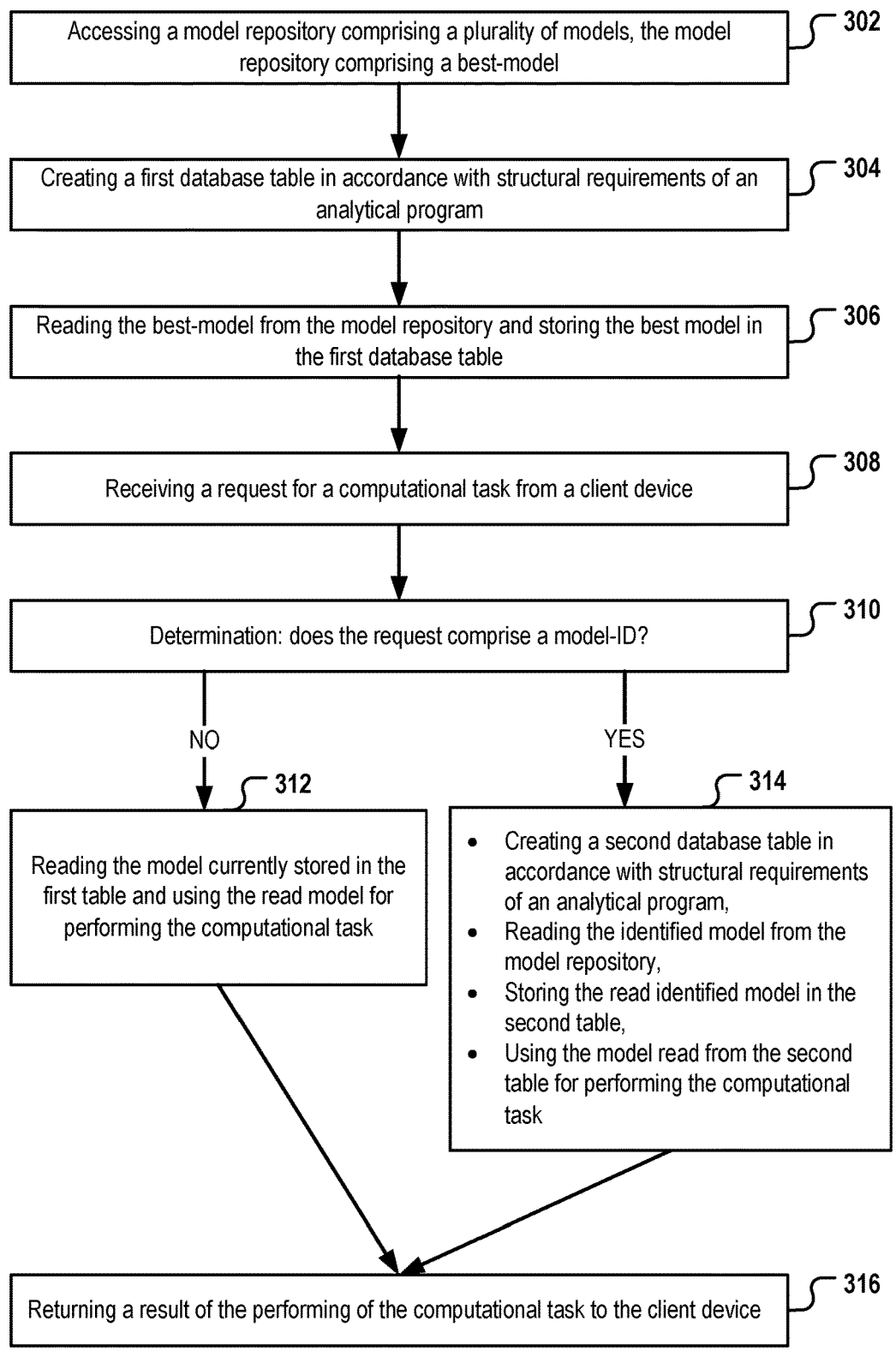
FIG. 3 is a flow diagram of a process to provide model-based prediction according to some embodiments.

FIG. 3 is a flow chart of performing a model-based computational task that can be performed e.g. by components of the system depicted in FIGS. 1 and 2. In step 302, upon instantiation of the analytical program 156, the analytical program analyzes a configuration 162 in which the best-model is specified and accesses the model repository, e.g. for reading model metadata that is used for creating a table for storing the best-model. In step 304, the analytical program creates a first static database table 142 whose structure is in compliance with structural requirements of the analytical program. In step 306, the analytical program reads the best-model from the model repository and stores it in the structure required by the analytical program or required by SQL routines that are called by the analytical program in the first table. The best-model in the first table will be used by the server for processing requests of the majority of clients in the majority of cases. Next in step 308, the analytical program receives a request 122, 123, 170 for performing a particular predictive task on some input data 124 from a client device 102 over a network 120. The input data is provided as part of the request to the analytical program instantiated on a server computer system 130. Next in step 310, the analytical program determines if the request comprises a model-ID. If not, as e.g. in case with request 122, the analytical program in step 312 reads the model M6 currently stored in the first table and uses the read model for performing the computational task on the input data 124. If the request comprises a model-ID, e.g. of model M14 as for request 122 or M36 as for request 170, the analytical program in step 314 creates a second database table in the database, e.g. table T14 for request 122 or table T36 for request 170. The second table is preferably a temporary in-memory database table that exists solely within the session context of the query. The created second database table has a predefined table structure that corresponds to structural requirements of the analytical program. Then, the analytical program reads the identified model from the model repository, stores the read identified model in the second table, and uses the model read from the second table for performing the computational task on the input data. In step 316, the analytical program returns the result computed based on the respectively used model and the input data to the client having submitted the request.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computer-implemented method for model-based analysis in a relational database, the method comprising:
  accessing a model repository comprising a plurality of models respectively being adapted to perform, when used by an analytical program, a computational task, the model repository comprising a best-model, the best-model being a default model for performing the computational task, and the analytical program being a plug-in or add-on or an integral component of a database management system (DBMS) that maintains the relational database;
  creating a first database table in the relational database, the first database table having a predefined table structure that corresponds to the analytical program;
  reading the best-model from the model repository and storing the best-model in the first database table;
  receiving, by the analytical program, a request of a client device to perform the computational task, the request comprising input data;
  the analytical program determining if the request comprises a model-ID;

if the received request does not comprise a model-ID, the analytical program reading the best-model currently stored in the first database table and using the read best-model for performing the computational task on the input data;

if the received request comprises a model-ID, the analytical program:
creating a second database table in the database, the second database table having the predefined table structure;
reading a model associated with the model-ID from the model repository;
storing the read model associated with the model-ID in the second database; and
using the model read from the second table for performing the computational task on the input data; and the analytical program returning a result of the performing of the computational task to the client device,
wherein the computational task is the classification of bioactive compounds, wherein the plurality of models are support-vector-machine-models and wherein the best-model is the one of the plurality of models which provides a most accurate classification.

2. The computer-implemented method of claim 1, wherein the models in the model repository comprise different numbers and/or types of hyperparameters,
the data format of the models in the model repository is the same for all models irrespective of the number and type of hyperparameters contained in a model, and
the predefined table structures of the first and second database tables depend upon the number and/or type of hyperparameters in the models.

3. The computer-implemented method of claim 1, wherein the computational task is the classification of bioactive compounds, wherein the plurality of models are support-vector-machine-models and wherein the best-model is the one of the plurality of models which provides a most accurate classification.

4. The computer-implemented method of claim 1, the first database table being created and a copy of the best-model being stored in the first database table before, during or after the instantiation of an analytical program and before the request is received.

5. The computer-implemented method of claim 1, each of the models in the model repository associated with a respective table structure selectively adapted to store said model in a structured format that corresponds to structural requirements of the analytical program, the first database table being created in accordance with the table structure assigned to the best-model, the creation of the second database table comprising:
in response to receiving the request, dynamically identifying a table structure assigned to the one of the models identified by the received model-ID, and creating the second database table in accordance with the identified table structure.

6. The computer-implemented method of claim 1, each of the models in the model repository associated with a model type, each of the model types associated with a table structure selectively adapted to store models of said model type in a structured format that corresponds to the analytical program, the first database table being created in accordance with the table structure associated with the model type to which the best-model is associated, the creation of the second database table comprising:

in response to receiving the request, dynamically identifying the model type of the model indicated in the request, identifying the table structure associated with the identified model type, and creating the second database table in accordance with the identified table structure.

7. The computer-implemented method of claim 1, further comprising:
automatically creating the plurality of models by applying a machine learning logic on training data;
automatically analyzing the plurality of models for identifying the best-model, the best-model being the one of the plurality of models being the best suited for solving the computational task; and
storing all created models in the model repository.

8. The computer-implemented method of claim 1, the plurality of models comprising multiple models having a different number of model parameters, wherein
the table structure used for creating the second database table in response to a request comprising a model-ID of one of said multiple models depends on the number of model parameters and differs for each of the multiple models.

9. The computer-implemented method of claim 1, the relational database being maintained by a DBMS, the analytical program comprising analytical SQL routines or a call to analytical SQL routines, the performing of the computational task comprising executing, by the DBMS, the analytical program routines, the analytical SQL routines being adapted to access specific columns of the first or second database table from which the model used by the analytical program is read.

10. The computer-implemented method of claim 1, the relational database being maintained by a DBMS, the analytical program comprising analytical SQL routines or a call to analytical SQL routines, the method comprising:
storing the received input data in one or more database tables of the relational database;
wherein the performing of the computational task comprises executing, by the DBMS, the analytical program routines, the analytical SQL routines being adapted to access specific columns of the one or more database tables comprising the input data.

11. The computer-implemented method of claim 1, the first database table being a static database table, the second database table being a temporary database table.

12. The computer-implemented method of claim 1, the first database table being accessible by multiple client devices concurrently, the second database table being created within a session between a server computer and the client device and being inaccessible and invisible by other client devices.

13. The computer-implemented method of claim 1, the relational database being maintained by a DBMS configured to repeatedly persist static tables in a non-volatile storage medium and to store temporary tables solely in a volatile storage medium.

14. The computer-implemented method of claim 1, further comprising:
receiving, by the analytical program, a further request of the client device to perform the computational task, the request comprising the input data and a model-ID of a further one of the models;
the analytical program identifying the further model and a further predefined table structure selectively adapted to store the further model in a further structured format, creating a third table in accordance with the further predefined table structure, reading the identified further model from the model repository, storing the read further model in the third table and using the model read from the third table for performing the computational task on the input data;

the analytical program returning a further result of the performing of the computational task with the further model to the client device.

15. A non-transitory hardware medium storing computer-executable program code, the program code executable by a computing system to:

access a model repository comprising a plurality of models respectively being adapted to perform, when used by an analytical program, a computational task, the model repository comprising a best-model, the best-model being a default model for performing the computational task, and the analytical program being a plug-in or add-on or an integral component of a DBMS that maintains the relational database;

create a first database table in a database, the first database table having a predefined table structure that corresponds to the analytical program;

read the best-model from the model repository and store the best-model in the first database table;

receive, by the analytical program, a request of a client device to perform the computational task, the request comprising input data;

the analytical program to determine if the request comprises a model-ID;

if the received request does not comprise a model-ID, the analytical program to read the best-model currently stored in the first database table and use the read best-model for performing the computational task on the input data;

if the received request comprises a model-ID, the analytical program to:

create a second database table in the database, the second database table having the predefined table structure, read a model associated with the model-ID from the model repository, store the read model associated with the model-ID in the second database table, and use the model read from the second database table for performing the computational task on the input data; and the analytical program to return a result of the performing of the computational task to the client device.

16. The medium of claim 15, each of the models in the model repository associated with a respective table structure selectively adapted to store said model in a structured format that corresponds to structural requirements of the analytical program, the first database table being created in accordance with the table structure assigned to the best-model, the creation of the second database table comprising:

in response to receiving the request, dynamically identifying a table structure assigned to the one of the models identified by the received model-ID, and creating the second database table in accordance with the identified table structure.

17. The medium of claim 15, the program code further executable by a computing system to:

receive, by the analytical program, a further request of the client device to perform the computational task, the request comprising the input data and a model-ID of a further one of the models;

the analytical program identifying the further model and a further predefined table structure selectively adapted to store the further model in a further structured format, creating a third table in accordance with the further predefined table structure, reading the identified further model from the model repository, storing the read further model in the third table and using the model read from the third table for performing the computational task on the input data;

the analytical program returning a further result of the performing of the computational task with the further model to the client device.

18. A computer system comprising a server computer system, the server computer system comprising:

a hardware processor;

a memory;

a network interface adapted for connecting the server computer system via a network to at least one client device;

a model repository, the model repository comprising a plurality of models respectively being adapted to perform, when used by an analytical program, a computational task, the model repository comprising a best-model, and the analytical program being a plug-in or add-on or an integral component of a DBMS that maintains the relational database; and a DBMS that maintains a relational database;

the analytical program configured for:

creating a first database table in the relational database, the first database table having a predefined table structure that corresponds to structural requirements of the analytical program;

reading the best-model from the model repository and storing the best-model in the first database table receiving a request of the at least one client device to perform the computational task via the network, the request comprising input data;

determining if the request comprises a model-ID;

if the received request does not comprise a model-ID, reading the model currently stored in the first database table and using the read best-model for performing the computational task on the input data;

if the received request comprises a model-ID, creating a second database table in the relational database, the second database table having a predefined table structure that corresponds to the analytical program, reading the identified model from the model repository, storing the read identified model in the second database table, and using the model read from the second database table for performing the computational task on the input data; and returning a result of the performing of the computational task to the client device via the network.

19. The computer system of claim 18, further comprising the at least one client device and at least one further client device, wherein the analytical logic is configured to read the best-model from the first database table in response to respective requests from multiple ones of the client devices, and wherein analytical logic is configured to store and read models identified via model-IDs in a request in temporary tables that are created specifically for the session context of requests of individual ones of the client devices.

* * * * *